United States Patent
Paramasivam et al.

(10) Patent No.: US 8,671,306 B2
(45) Date of Patent: Mar. 11, 2014

(54) SCALING OUT A MESSAGING SYSTEM

(75) Inventors: Kartik Paramasivam, Redmond, WA (US); Murali Krishnaprasad, Redmond, WA (US); Jayu Katti, Redmond, WA (US); Pramod Gurunath, Sammamish, WA (US); Affan Arshad Dar, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 512 days.

(21) Appl. No.: 12/973,945

(22) Filed: Dec. 21, 2010

(65) Prior Publication Data

US 2012/0159246 A1  Jun. 21, 2012

(51) Int. Cl.
*G06F 11/00* (2006.01)

(52) U.S. Cl.
USPC ........... 714/4.1; 714/4.11; 714/4.12; 714/4.2; 714/4.21; 714/4.3; 709/202; 709/203; 709/244

(58) Field of Classification Search
USPC ......... 709/202, 203, 244; 714/4.1, 4.11, 4.12, 714/4.2, 4.21, 4.3
See application file for complete search history.

(56) References Cited

U.S. PATENT DOCUMENTS

| | | | |
|---|---|---|---|
| 6,058,389 A | 5/2000 | Chandra et al. | |
| 6,643,682 B1 * | 11/2003 | Todd et al. | 709/202 |
| 6,687,222 B1 * | 2/2004 | Albert et al. | 370/230 |
| 6,877,107 B2 * | 4/2005 | Giotta et al. | 714/4.3 |
| 7,437,404 B2 * | 10/2008 | Shen | 709/202 |
| 7,747,894 B2 * | 6/2010 | Musayev et al. | 714/4.1 |
| 8,082,307 B2 * | 12/2011 | Wallis et al. | 709/206 |
| 8,171,466 B2 * | 5/2012 | Langen et al. | 717/170 |
| 8,199,668 B2 * | 6/2012 | Wallis et al. | 370/254 |
| 8,214,424 B2 * | 7/2012 | Arimilli et al. | 709/201 |
| 2002/0095454 A1 * | 7/2002 | Reed et al. | 709/201 |
| 2003/0009511 A1 * | 1/2003 | Giotta et al. | 709/201 |
| 2003/0120720 A1 | 6/2003 | Montero | |
| 2004/0010778 A1 * | 1/2004 | Kaler et al. | 717/130 |
| 2005/0108593 A1 * | 5/2005 | Purushothaman et al. | 714/4 |
| 2006/0143278 A1 * | 6/2006 | Bauchot et al. | 709/206 |
| 2006/0271634 A1 * | 11/2006 | England et al. | 709/206 |
| 2006/0277317 A1 | 12/2006 | Clark et al. | |
| 2007/0067389 A1 | 3/2007 | Bedi et al. | |
| 2007/0220302 A1 * | 9/2007 | Cline et al. | 714/4 |
| 2008/0034051 A1 * | 2/2008 | Wallis et al. | 709/207 |
| 2010/0158097 A1 | 6/2010 | Pascal et al. | |

OTHER PUBLICATIONS

"Scaling Out Receiving Hosts", Retrieved at << http://msdn.microsoft.com/en-us/library/ee308860%28BTS.10%29.aspx >>, pp. 3, Mar. 5, 2008.

"Introducing Amazon SimpleDB", Retrieved at << http://www.databasejournal.com/sqletc/article.php/26861_3897961_3/Introducing-Amazon-SimpleDB.htm >>, Aug. 18, 2010,, pp. 9.

Browne, Christopher , "Alternatives to CORBA", Retrieved at << http://linuxfinances.info/info/corbaalternatives.html >>, pp. 9, Feb. 1, 2001.

* cited by examiner

*Primary Examiner* — Joshua P Lottich
(74) *Attorney, Agent, or Firm* — David Andrews; Ben Tabor; Micky Minhas

(57) ABSTRACT

A messaging system may operate on multiple processor partitions in several configurations to provide queuing and topic subscription services on a large scale. A queue service may receive messages from a multiple transmitting services and distribute the messages to a single service. A topic subscription service may receive messages from multiple transmitting services, but distribute the messages to multiple recipients, often with a filter applied to each recipient where the filter defines which messages may be transmitted by the recipient. Large queues or topic subscriptions may be divided across multiple processor partitions with separate sets of recipients for each partition in some cases, or with duplicate sets of recipients in other cases.

20 Claims, 4 Drawing Sheets

SCALING OUT A MESSAGING SYSTEM

BACKGROUND

Messaging systems are mechanisms by which distributed applications may communicate between disparate portions of the application. A distributed application may have several components that may operate independently, often on different processors or different computers that may be located physically distant from each other.

Messaging systems may operate by passing messages from one component of a distributed application to another through a queuing system. A queue may receive several messages, then pass the messages to a recipient when the recipient is ready to receive the messages.

SUMMARY

A messaging system may operate on multiple processor partitions in several configurations to provide queuing and topic subscription services on a large scale. A queue service may receive messages from multiple transmitting services and distribute the messages to a single service. A topic subscription service may receive messages from multiple transmitting services, but distribute the messages to multiple recipients, often with a filter applied to each recipient where the filter defines which messages may be transmitted by the recipient. Large queues or topic subscriptions may be divided across multiple processor partitions with separate sets of recipients for each partition in some cases, or with duplicate sets of recipients in other cases.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
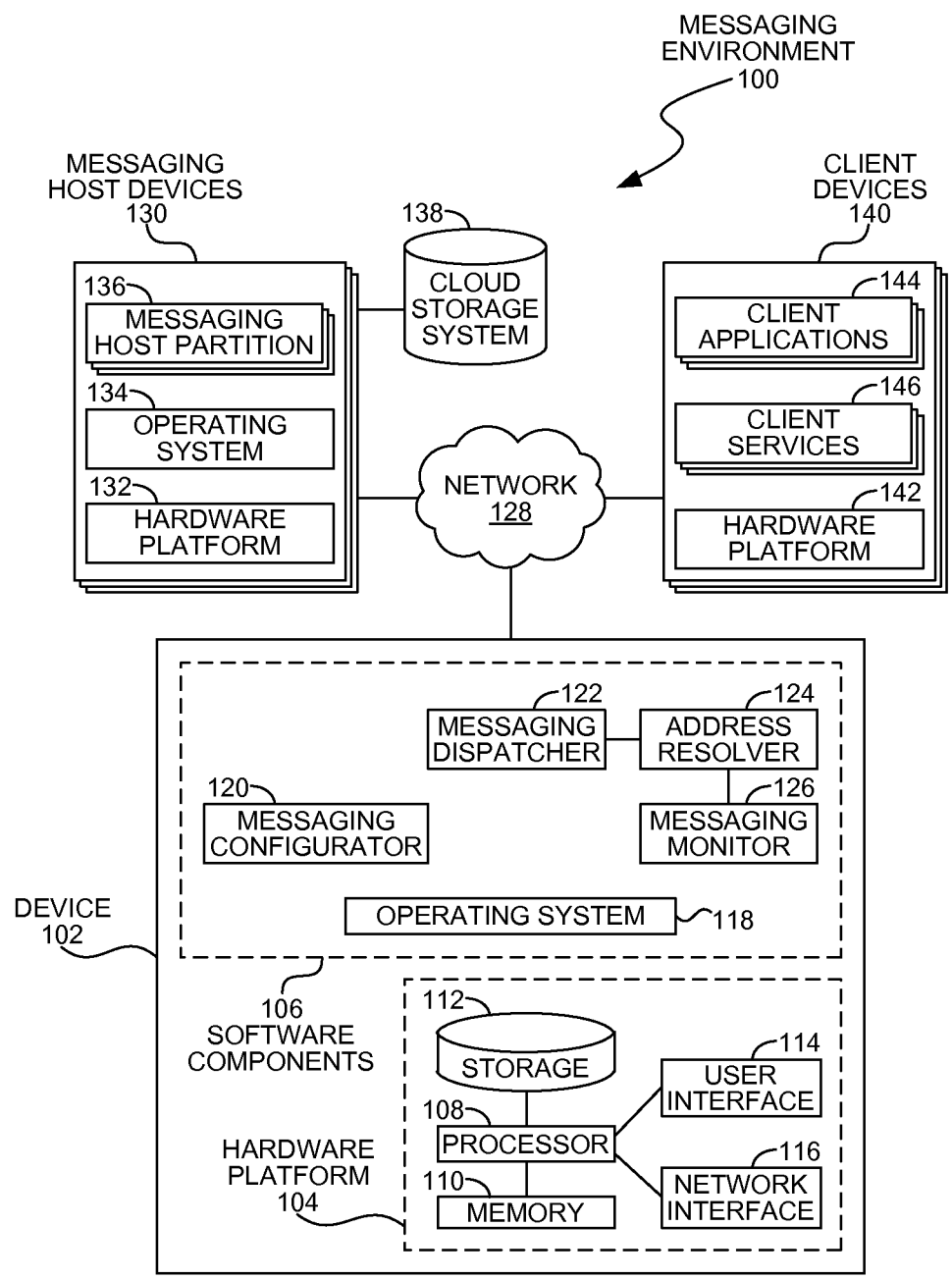
FIG. 1 is a diagram illustration of an embodiment showing a messaging environment.

A messaging system may operate on many processing partitions in order to scale a messaging system to virtually unlimited sizes. The processing partitions may perform a subset of the larger messaging object, which may be a queue or a subscription topic. In some cases, messaging objects with large numbers of recipients may be partitioned or allocated into several partitions, each servicing a subset of the recipients. In other cases, duplicate processing partitions may be created to service the same subset of recipients. Such embodiments may be useful for cases with very high loads, as the loads may be distributed or balanced across multiple processing partitions.

The messaging objects may be either queues or subscription topics. A queue may be a first-in, first-out buffer that may receive, store, and transmit messages to a single recipient. In some cases, a queue may be configured for several different recipients and messages sent to the queue may have an address or identifier that may be used to direct the message to the desired recipient. A typical queue may receive messages from many different sources, but may transmit messages to one recipient.

A subscription topic may be a version of a queue that may have multiple recipients. In many embodiments, each recipient or subscriber may have a filter that may have criteria defining which messages are desired for the particular subscriber. In many cases, multiple processes may transmit messages to the subscription topic. A queue may be treated as a special case of a subscription topic with only one recipient that may receive all messages.

Throughout this specification and claims, the term "processing partition" may be used to describe a unit of computational resources. A processing partition may be a set of processes, threads, or other executable code that may operate on a hardware platform. In many embodiments, the processing partitions may be stateless, and the processing partitions may execute workload items stored in a centralized storage. In some cases, a single hardware processor or hardware platform may execute two or more processing partitions. In some cases, each hardware processor or hardware platform may execute a single processing partition.

In some embodiments, the processing partition may be implemented as a virtual machine that may execute on various hardware platforms. A virtual machine implementation may be useful in cases where the processing partitions may be consolidated to a few hardware platforms during periods of low usage, and then distributed across many hardware platforms during periods of high usage.

In some cases, a single processing partition may operate on a single processor. In other cases, two or more processing partitions may be executed on a single processor. In still other cases, multiple processors may execute a single processing partition.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a messaging system environment. Embodiment 100 is a simplified example of a system that may provide messaging services to distributed applications.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection or more components are operating on a single hardware platform. In other cases, the connections may be made over network connections spanning long distances. Each embodiment may use different hardware, software, and interconnection architectures to achieve the described functions.

Embodiment 100 may be an example environment for a messaging system. A messaging system may pass messages from one application or service to another, and may be a component of a distributed application. In many cases, a messaging system may be a reusable component on which many different distributed applications may be constructed and may operate.

In a distributed application, one application or service may perform a certain task, then pass a message to another application or service to perform another task. In many cases, the messages may contain output data from one service that may be consumed and further processed by another service. The messages may be transmitted over a local area network, a wide area network, the Internet, a high speed dedicated network, or some other network.

Distributed applications may include processes, applications, or services that may be supplied by different providers. For example, a portion of a distributed application may operate within a company's servers and on the company's premises, while other portions may execute on a publicly accessible web service that may be located at a datacenter located somewhere in the world.

In order for a distributed application to operate, a messaging system may transmit messages from one service or application to another. Many messaging systems may operate different forms of queues or buffers, where messages may be stored for a period of time until a recipient may be able to receive and process the message.

Fault tolerant embodiments may operate by transmitting a message to a recipient, and keeping the message until an acknowledgement may be received from the recipient that the message has been successfully passed. Such embodiments may have a timeout or other mechanism that may retry sending the message until successful.

A messaging environment may be controlled and managed with a device 102. The device 102 is illustrated having hardware components 104 and software components 106. The device 102 as illustrated represents a conventional computing device, although other embodiments may have different configurations, architectures, or components.

In many embodiments, the device 102 may be a server computer or personal computer. The device 102 may also be a desktop computer or comparable device. In some embodiments, the device 102 may still also be a laptop computer, netbook computer, tablet or slate computer, wireless handset, cellular telephone, or any other type of computing device.

The hardware components 104 may include a processor 108, random access memory 110, and nonvolatile storage 112. The hardware components 104 may also include a user interface 114 and network interface 116. The processor 108 may be made up of several processors or processor cores in some embodiments. The random access memory 110 may be memory that may be readily accessible to and addressable by the processor 108. The nonvolatile storage 112 may be storage that persists after the device 102 is shut down. The nonvolatile storage 112 may be any type of storage device, including hard disk, solid state memory devices, magnetic tape, optical storage, or other type of storage. The nonvolatile storage 112 may be read only or read/write capable.

The user interface 114 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 116 may be any type of connection to another computer. In many embodiments, the network interface 116 may be a wired Ethernet connection. Other embodiments may include wired or wireless connections over various communication protocols.

The software components 106 may include an operating system 118 on which various applications and services may operate. An operating system may provide an abstraction layer between executing routines and the hardware components 104, and may include various routines and functions that communicate directly with various hardware components.

The software components 106 may include a messaging configurator 120. The messaging configurator 120 may be an application that may create a messaging object within a farm of messaging computers. The farm of messaging computers may be represented by a set of messaging host devices 130.

The messaging configurator 120 may create a messaging object by configuring one or more processing partitions within the farm of messaging computers according to a request for a messaging object. In cases where a single processing partition may adequately service a queue or subscription topic, the messaging object may be created and configured on a single processing partition.

The messaging configurator 120 may distribute a messaging object to multiple processing partitions in certain circumstances. In situations with a large number of recipients, a messaging object may be divided into smaller partitions, each of which may process messages for a subset of the recipients. In such embodiments, a message received for the messaging object may be passed to and processed by each processing partition.

In embodiments with large numbers of messages, several processing partitions may be created to serve identical sets of recipients. In such embodiments, a load balancing routine may distribute the messages to the various processing partitions such that the processing partitions may operate in parallel and thus achieve higher throughput.

A messaging dispatcher 122 may receive messages from a client device and may route the messages to a processing partition that may be executing a messaging object. The messaging dispatcher 122 may use an address resolver 124 to determine an address, such as a network address, for a specific processing partition.

A messaging monitor 126 may monitor the performance of each processing partition and may take corrective action in situations where a processing partition has failed or is having problems. The messaging monitor 126 may be capable of restarting a processing partition as well as moving a processing partition to another hardware platform. When the messaging monitor 126 may transfer a processing partition to another hardware platform, the messaging monitor 126 may update the address resolver 124 to indicate a new location for the processing partition.

The messaging operations may be performed by set of messaging host devices 130, which may represent a farm of computing devices that may perform messaging operations. The farm of computers may allow the message system to be expanded to a much larger capacity than a single-computer messaging system.

Each of the messaging host devices 130 may operate on a hardware platform 132, which may be similar to the hardware platform 104. In a typical datacenter deployment, the messaging host devices 130 may be server computer devices.

Each messaging host device 130 may have an operating system 134 on which a messaging host partition 136 may operate. The messaging host partition 136 may execute a processing partition as created by the messaging configurator 120.

In some embodiments, a single messaging host device 130 may execute one or more messaging host partitions 136. Some embodiments may implement the messaging host partitions 136 as virtual machines or other virtualized processes. Such embodiments may allow a datacenter manager to manage the computational workload by moving the virtualized processes from one hardware platform to another, including consolidating multiple virtualized processes onto a single hardware platform.

In many embodiments, each of the messaging host partitions 136 may communicate with a cloud storage system 138 where various work items may be stored. The work items may be messages or other items that may be processed by the messaging host partitions. The messaging host partitions 136 may retrieve the work items from the cloud storage system 138 to execute, and may store any state for the processing partitions in the cloud storage system 138. Such embodiments may allow the messaging host partitions 136 to be restarted, moved, or otherwise managed without having to manage the state of the processing partition.

Various client devices 140 may operate application parts that may send and receive messages. The client devices 140 may perform the actions of a distributed application when messages may be passed amongst the client devices 140. In some embodiments, many hundreds or thousands of client devices 140 may operate as part of a distributed application.

The client devices 140 may each have a hardware platform 142, which may be similar to the hardware platform 104. The client devices 140 may execute various client applications 144 and client services 146 which may be components of a distributed application.

Figure 2:
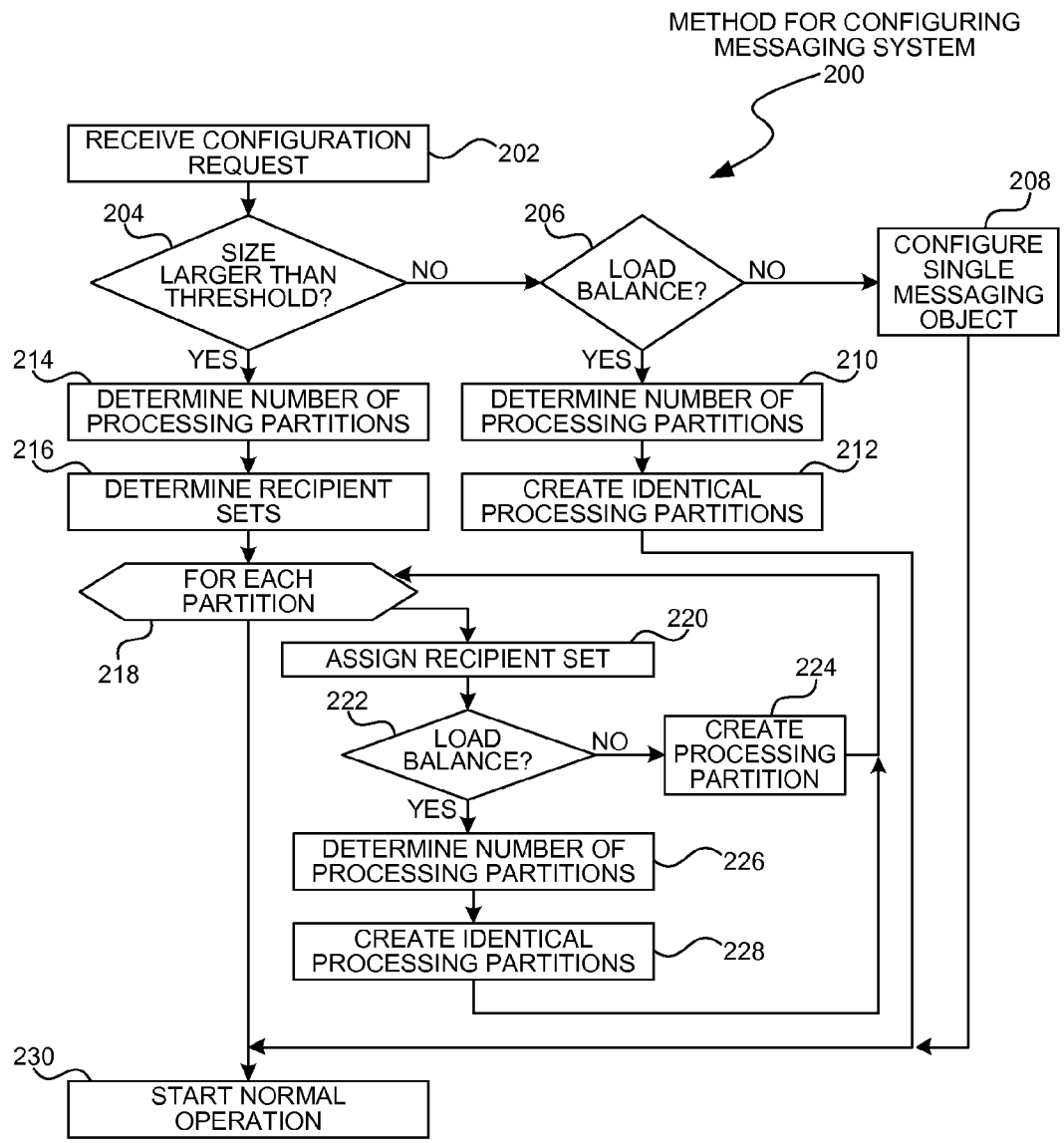
FIG. 2 is a flowchart illustration of an embodiment showing a method for configuring a messaging system.

FIG. 2 is a flowchart illustration of an embodiment 200 showing a method for configuring a messaging system. The process of embodiment 200 illustrates a method by which several different types of messaging system configurations may be created, including a single messaging object on a single processing partition, load balanced messaging objects, and distributed or segmented messaging objects delivered on multiple processing partitions. The operations of embodiment 200 may reflect operations performed by a messaging configurator, such as the messaging configurator 120 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates a generalized process or logic for selecting between three different configurations for messaging objects. The messaging objects may be queues, subscription topics, or other messaging objects that may be implemented on one or more processing partitions.

A configuration request may be received in block 202. The configuration request may include various parameters for a messaging object. In some embodiments, the configuration request may include various descriptors for the anticipated size of the messaging object which may be used to determine the computational resources that may be assigned to the messaging object. The configuration request may include the type of messaging object, the types of anticipated messages, recipients, and other information that may be used to create a messaging object.

If the anticipated size of the messaging object is less than a predefined threshold in block 204 and the messaging object may not be load balanced in block 206, a single messaging object may be created in block 208 on a single processing partition.

If the anticipated size is less than the threshold in block 204, but the messaging object may be load balanced in block 206, the number of identical processing partitions may be identified in block 210 and the processing partitions may be created in block 212.

In a load balanced implementation, two or more processing partitions may operate in parallel to handle a larger workload than a single processing partition. The messages received by the messaging system may be distributed to the various processing partitions according to a load balancing scheme.

If the size of the messaging object is anticipated to be larger than the threshold in block 204, the number of processing partitions may be determined in block 214 and the recipient sets for each of the processing partitions may assigned in block 216.

Each of the partitions may be processed in block 218. For each partition in block 218, the recipient set may be assigned in block 220. If the partition may not be load balanced in block 222, a single processing partition may be created in block 224.

If the partition may be load balanced in block 222, a number of processing partitions may be determined in block 226 and a group of identical processing partitions may be created in block 228.

After creating and configuring all of the processing partitions, normal operation of the messaging system may begin in block 230.

Embodiment 200 illustrates several different types of messaging systems. In a load balanced system, several identical processing partitions may be used. The identical processing partitions may be executed on multiple hardware platforms and the messaging loads may be distributed across each of the processing partitions. Such an embodiment may have higher throughput than a single processing partition executing on a single hardware platform. In such an embodiment, a single message may be processed by a single processing partition.

In another messaging system configuration, the messaging object may be much larger than what could be handled on a single processing partition. In such a case, the messaging object may be broken into separate portions, and each portion may be executed separately in a different processing partition. In such an embodiment, a single message may be processed by multiple processing partitions, where each processing partition may execute only a fraction of the entire messaging object. Some embodiments may use a combination or dividing a large messaging object into portions, and for each portion using a load balanced configuration.

Figure 3:
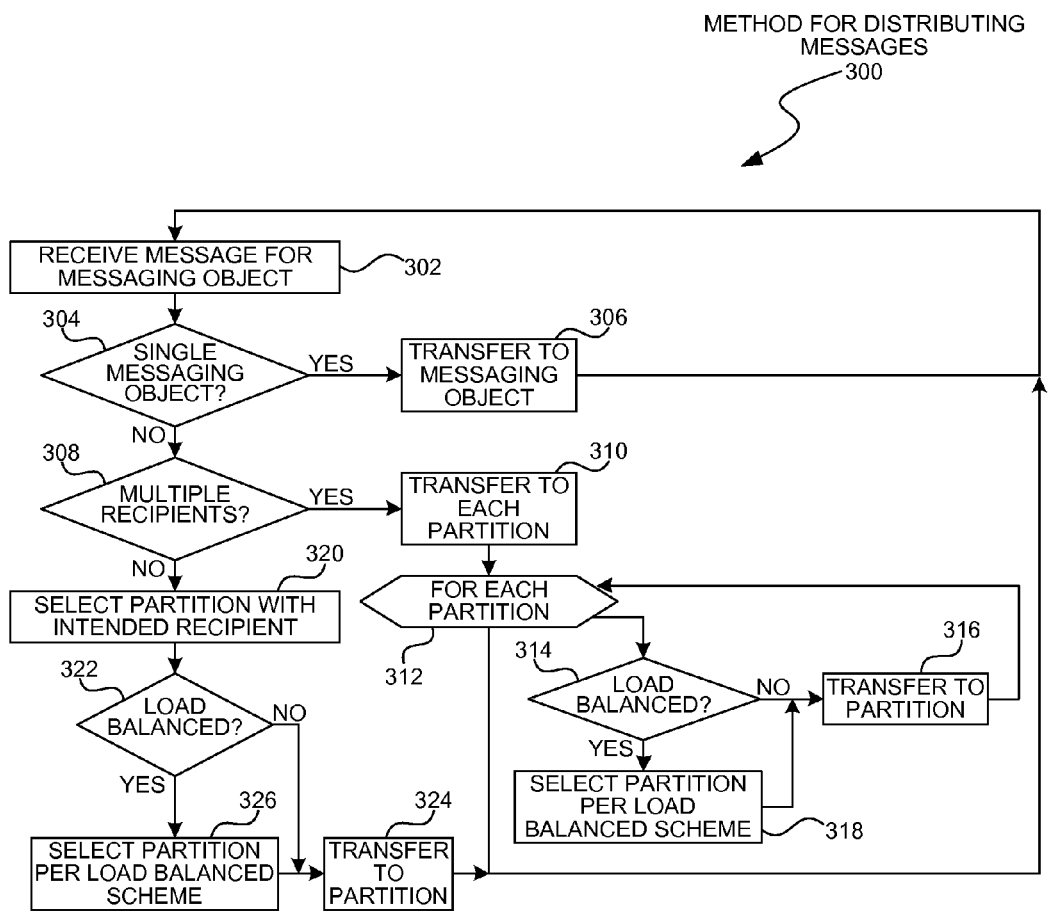
FIG. 3 is a flowchart illustration of an embodiment showing a method for distributing messages.

FIG. 3 is a flowchart illustration of an embodiment 300 showing a method for distributing messages to processing partitions. The process of embodiment 300 illustrates a method by which messages may be transferred from a centralized messaging dispatcher to one or more messaging objects executing on processing partitions. The operations of embodiment 300 may reflect the operations of a messaging dispatcher such as messaging dispatcher 122 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates a simplified example of a method that may be used to distribute messages to several different configurations of messaging objects. The configurations may include a single messaging object that may operate on a single processing partition, a load balanced messaging object, and various forms of a distributed messaging object. The distributed messaging object may include queues or subscription topics where recipients may be distributed to multiple processing partitions.

A message may be received in block 302.

If the message is intended for a messaging object implemented on a single processing partition in block 304, the message may be transferred to the messaging object in block 306. The process may return to block 302 for another message.

If the message is not intended for a single messaging object in block 304, and the messaging object is configured with multiple recipients in block 308, each processing partition that may execute the messaging object may receive the message in block 310. A messaging object that has multiple recipients may be one in which the message object may be very large and may be divided into several portions. In such an embodiment, each portion of the messaging object may provide messaging services for the separate and non-overlapping sets of recipients as other messaging objects. In contrast, some cases may be configured where each portion of the messaging object may have overlapping sets of recipients, and the message may be sent to only one of the portions of messaging object.

In some such embodiments, the partitions may be load balanced. For each partition in block 312, if the partition is load balanced in block 314, a partition may be selected in block 318 according to a load balancing scheme, and the message may be transferred to the partition in block 316. If no load balancing is used for the partition in block 314, the message may be transferred to the partition in block 316.

If there are multiple messaging objects in block 304 and only a single recipient in block 308, the messaging object may be divided into several different processing partitions. The processing partition may be selected in block 320. If the portion of the messaging object may be load balanced in block 322, the partition ma be selected by a load balancing scheme in block 326 and the message may be transferred in block 324. If there is no load balancing in block 322, the message may be transferred in block 324.

The load balancing schemes may be any type of mechanism to distribute messages to various processing partitions. One example of such a mechanism may be to assign the messages to the various processing partitions in a round robin order. In another example, a monitoring system may monitor the activities of the various processing partitions and may assign messages to the processing partition with the lightest processing load.

Figure 4:
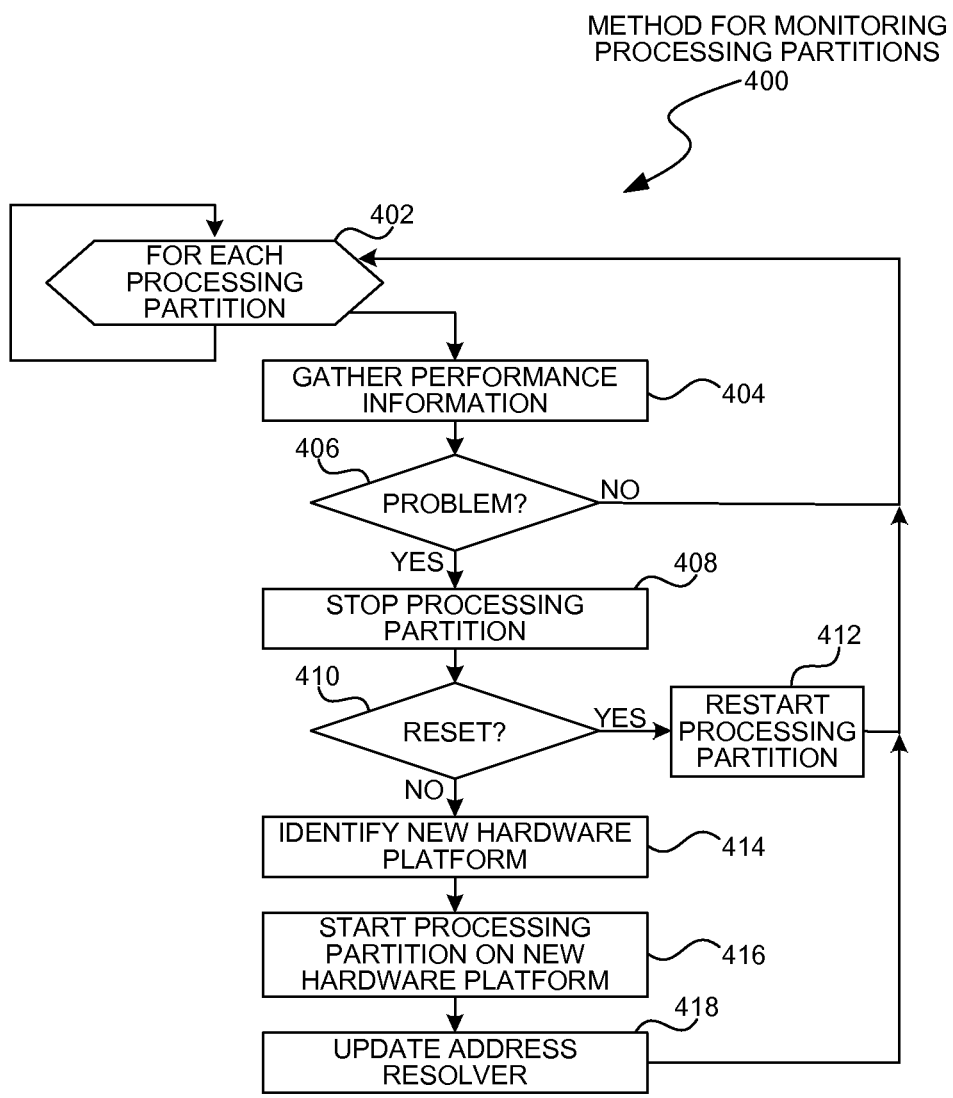
FIG. 4 is a flowchart illustration of an embodiment showing a method for monitoring processing partitions.

FIG. 4 is a flowchart illustration of an embodiment 400 showing a method for monitoring processing partitions. The process of embodiment 400 illustrates one method by which processing partitions with problems may be restarted or moved to another hardware platform. The operations of embodiment 400 may be performed by a messaging monitor, such as the messaging monitor 126 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Each processing partition may be evaluated in block 402. For each processing partition in block 402, performance information may be gathered in block 404. If no problem exists in block 406, the process may return to block 402.

If a problem is detected in block 406, the processing partition may be halted in block 408. If the possible solution may be to reset the processing partition in block 410, the processing partition may be restarted in block 412.

If the possible solution is not to restart the processing partition in block 410, a new hardware platform may be identified in block 414 and the processing partition may be moved to a new hardware platform in block 416 and restarted. An address resolver may be updated in block 418 so that a message distributor may be able to locate the processing partition at the new location.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
   one or more hardware processors;
   one or more storage devices having stored thereon computer executable instructions that, when executed by the one or more hardware processors, instantiate a plurality of modules, including:
   a messaging configurator that is configured to:
      receive a request for a messaging object, said request comprising a size indicator;
      determine whether the size indicator is larger than a predefined threshold; and
      configure a plurality of processing partitions for said messaging object; and
   a messaging dispatcher that is configured to:
      receive a message for said messaging object;
      determine a first processing partition for said message; and
      transmit said message to said first processing partition, wherein said first processing partition distributes said message to a first recipient.

2. The system of claim 1, said first processing partition operating on a first hardware platform and a second processing partition operating on a second hardware platform, said first processing partition and said second processing partition being configured for said messaging object.

3. The system of claim 2, said first processing partition being configured for a first set of recipients, and said second processing partition being configured for a second set of recipients.

4. The system of claim 3, said first set of recipients being the same as said second set of recipients.

5. The system of claim 3, said first set of recipients not including any common recipients with said second set of recipients.

6. The system of claim 1, said messaging object being a message queue, said message queue having a single recipient.

7. The system of claim 1, said messaging object being a subscription topic having a plurality of recipients.

8. The system of claim 7, said subscription topic having a first filter for a first recipient, said first recipient being one of said plurality of recipients.

9. The system of claim 1 further comprising: a storage system comprising state information for each of said plurality of processing partitions.

10. The system of claim 9, each of said plurality of processing partitions being a stateless processing partition.

11. The system of claim 10 further comprising: a monitoring system that: detects that said first processing partition has encountered a problem; and causes said first processing partition to be restarted.

12. The system of claim 11, said first processing partition encountering a problem while executing on a first hardware platform, said monitoring system that further: causes said first processing partition to be restarted on a second hardware platform.

13. A method comprising:
   receiving a request for a messaging object, said request comprising a size indicator;
   determining that said size indicator is larger than a predefined threshold;
   creating a plurality of processing partitions, each of said processing partitions being configured for at least a portion of said messaging object;
   receiving a message for said messaging object;
   determining a first processing partition to process said message; and
   transmitting said message to said first processing partition, said first processing partition receiving said message and transmitting said message to a first recipient when said first recipient is ready to receive said message.

14. The method of claim 13 further comprising: configuring each of said processing partitions with the same set of recipients.

15. The method of claim 14 further comprising: determining a loading for said first processing partition and said second processing partition; and selecting said first processing partition for said first message when said loading for said first processing partition is lower than said second processing partition.

16. The method of claim 13 further comprising: configuring a first processing partition with a first set of recipients and a second processing partition with a second set of recipients, said first set of recipients and said second set of recipients having no common recipients.

17. The method of claim 16, said messaging object being a subscription topic, said method further comprising: transmitting said message to said second processing partition.

18. A system comprising:
   one or more hardware processors;
   one or more storage devices having stored thereon computer executable instructions that, when executed by the one or more hardware processors, instantiate a plurality of modules, including:
   a messaging configurator that is configured to:
      receive a request for a messaging object, said request comprising a first recipient, a second recipient, and a messaging object size, said messaging object being a subscription topic; and
      configure a plurality of processing partitions for said messaging object, a first processing partition being configured to transmit messages to said first recipient; and
   a messaging dispatcher that is configured to:
      receive a message for said messaging object, said message being intended for said first recipient;
      select said first processing partition for said message, said first processing partition being selected from said plurality of processing partitions; and determine an address for said first processing partition and transmit said message to said first processing partition, wherein said first processing partition distributes said message to said first recipient.

19. The system of claim 18 further comprising: applying a filter to said message to determine that said second recipient is to receive said message; and transmitting said message to said second recipient.

20. The system of claim 18 further comprising: applying a filter to said message to determine that said second recipient is not to receive said message; and refraining from transmitting said message to said second recipient.

* * * * *